(12) United States Patent
Rosser

(10) Patent No.: US 11,138,775 B1
(45) Date of Patent: Oct. 5, 2021

(54) INTERACTIVE ILLUSTRATION SYSTEM, INTERACTIVE ANIMATION SYSTEM, AND METHODS OF USE

(71) Applicant: Richard R. Rosser, Pacific Palisades, CA (US)

(72) Inventor: Richard R. Rosser, Pacific Palisades, CA (US)

( * ) Notice: Subject to any disclaimer, the term of this patent is extended or adjusted under 35 U.S.C. 154(b) by 0 days.

(21) Appl. No.: 17/187,748

(22) Filed: Feb. 27, 2021

Related U.S. Application Data

(60) Provisional application No. 63/062,312, filed on Aug. 6, 2020, provisional application No. 63/152,713, filed on Feb. 23, 2021.

(51) Int. Cl.
  *G06T 11/40* (2006.01)
  *G06T 13/00* (2011.01)

(52) U.S. Cl.
  CPC ............. *G06T 11/40* (2013.01); *G06T 13/00* (2013.01)

(58) Field of Classification Search
  CPC ............................... G06T 11/40; G06T 13/00
  See application file for complete search history.

(56) References Cited

U.S. PATENT DOCUMENTS

| | | | | |
|---|---|---|---|---|
| 6,606,105 B1* | 8/2003 | Quartetti | ............... | G06F 3/0481 715/203 |
| 2007/0094328 A1* | 4/2007 | Birch | .................... | G06Q 10/10 709/204 |
| 2015/0154676 A1* | 6/2015 | Matousek | ........... | G06F 3/04842 705/26.5 |
| 2019/0339794 A1* | 11/2019 | Reynolds | ............ | G06F 3/03543 |
| 2020/0193768 A1* | 6/2020 | Laster | ................. | G07F 17/3274 |

OTHER PUBLICATIONS

Flagg et al., Projector-guided painting, UIST '06 Proceedings of the 19th annual ACM symposium on User interface software and technology, Oct. 2006, pp. 235-244. (Year: 2006).*

* cited by examiner

*Primary Examiner* — Maurice L. McDowell, Jr.
*Assistant Examiner* — Donna J. Ricks

(57) ABSTRACT

An interactive illustration system, interactive animation system, and methods of use are presented. The present disclosure reveals an illustration and/or narrative and/or geometric figure in subsequent layers so that a user can be surprised by the coloring and engaged by the stimulus of the surprise created by the experience. The present disclosure relates to an interactive coloring system and animation system having gamification elements and interactive graphical features. More specifically, and without limitation, the present disclosure relates to interactivity and gamification in the coloring game genre.

20 Claims, 12 Drawing Sheets ically, a color book or coloring book is a type of book containing line art or figures in which a user adds color to shapes using various coloring tools. These coloring tools may include pencils, colored pencils, shading pencils, crayons, markers, marker pens, paint brushes, paint, and the like.

INTERACTIVE ILLUSTRATION SYSTEM, INTERACTIVE ANIMATION SYSTEM, AND METHODS OF USE

CROSS-REFERENCE TO RELATED APPLICATIONS

The present application claims priority to U.S. Provisional Patent Application No. 63/062,312 which was filed on Aug. 6, 2020 and U.S. Provisional Patent Application No. 63/152,713 which was filed on Feb. 23, 2021, which are hereby incorporated by reference herein in their entirety, including any figures, tables, or drawings.

FIELD OF THE DISCLOSURE

The present disclosure relates generally to an interactive illustration system, interactive animation system, and methods of use. More specifically, and without limitation, the present disclosure relates to an interactive coloring system with gamification elements and interactive graphical features. More specifically, and without limitation, the present disclosure relates to interactivity and gamification in the coloring game genre.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document: Copyright Richard R. Rosser. All rights reserved.

BACKGROUND OF THE DISCLOSURE

Coloring books are old and well known in the art. A coloring book is a collection of images which contain lines on white and/or black paper, traditionally. In this way, a user would fill in sections of images with various colors, creating a unique design. In this way, a coloring book provides a user with a way to create a unique piece of art work without the sophistication of a seasoned artist. In other words, kids and others can practice various motor skills and create a fun creation using a coloring book.

Typically, and historically, a color book or coloring book is a type of book containing line art or figures in which a user adds color to shapes using various coloring tools. These coloring tools may include pencils, colored pencils, shading pencils, crayons, markers, marker pens, paint brushes, paint, and the like.

A traditional coloring book is printed on paper and will be bound much like a book is. In this way, a coloring book may also tell a story, involve games, involve mazes, and/or other puzzles, or provide other interactions for users, users being of varying ages. Similarly, some of the pages may have perforated edges, such that pages may be easily removed from the book before or after the coloring has been completed. In this way, the completed coloring may be easier with the page removed or the page may be removed for display.

Coloring books are known for their educational purposes. Commonly a toddler or young person will complete a coloring book or page to develop motor skills, as well as other developmental skills. Additionally, coloring books are known for many other health and therapeutic uses including educational, hand-eye rehabilitation and/or maintenance, stress reduction, and the like.

The present disclosure provides a new, modern take on some of the favorite features of entertainment and strengthening of mental acuity (including development and maintaining skills). The present disclosure provides a novel, interactive system and methods of use which include gamification elements. Thus, the present disclosure provides the state of the art with modern, more enjoyable, systems designed to engage users for entertainment, mental development, motor skill and functional development, therapeutic purposes, relaxation assistance, rehabilitation functionality, and hand-eye coordination maintenance and practice skills for injured, trauma, and/or aging users, and the like.

SUMMARY OF THE DISCLOSURE

The present disclosure relates generally to a new, modern take on some of the favorite features of entertainment and strengthening of mental acuity (including development and maintaining skills). The present disclosure provides a novel, interactive system and methods of use which include gamification elements. Thus, the present disclosure provides the state of the art with modern, more enjoyable, systems designed to engage users for entertainment, mental development, motor skill and functional development, therapeutic purposes, relaxation assistance, rehabilitation functionality, and hand-eye coordination maintenance and practice skills for injured, trauma, and/or aging users, and the like.

In this way, the present disclosure provides a system and method of use which provides a beneficial activity for children; an activity that accelerates the mental development as well as in the development of fine motor skills. Furthermore, the present disclosure provides a system and method of use which aids in the development of creativity of children as well as causes stimulation in creativity in children.

In this way, the present disclosure provides a system and method of use which provides a beneficial activity for adults; an activity that accelerates the mental development as well as in the development and maintenance of fine motor skills. Furthermore, the present disclosure provides a system and method of use which aids in the development of creativity of adults who may have suffered trauma. Additionally, the present disclosure provides a system and method of use that reduces stress and anxiety levels in adults.

In this way, the present disclosure provides a system and method of use which provides a beneficial coloring activity for aging citizens; various methods of use within provide activity that aids in stimulating thought and keeping minds and memories sharp. Mental maintenance and/or mental development as well as in the development and maintenance of fine motor skills and maintenance of these skills. Furthermore, the present disclosure provides a system and method of use which aids in the maintenance and development of creativity of aging citizens who may have suffered trauma. Additionally, the present disclosure provides a system and method of use that reduces stress and anxiety levels in aging citizens and/or users who may have suffered trauma.

In this way, the present disclosure provides a system and methods of use which provide a novel system which utilizes coloring games to perform these functions and more. In this way, the present disclosure offers a system of coloring games which both entertain, strengthen physically, and mentally the user.

Thus, it is a primary object of the present disclosure to provide an interactive illustration system, interactive animation system, and methods of use to provide entertainment, physical skill development, and mental development, with real time interactions and functionality, that provides a novel system for the state of the art in addition to improving upon the state of the art.

Another object of the disclosure is to provide an interactive illustration system, interactive animation system, and method of use that brings interactivity to an interactive coloring game.

Yet another object of the disclosure is to provide an interactive illustration system, interactive animation system, and method of use that provides gamification in an interactive coloring game.

Another object of the disclosure is to provide an interactive illustration system, interactive animation system, and method of use that provides acceleration in development of fine motor skills in children.

Yet another object of the disclosure is to provide an interactive illustration system, interactive animation system, and method of use that provides for a creativity stimulus in children.

Another object of the disclosure is to provide an interactive illustration system, interactive animation system, and method of use that keeps the mind sharp for a user.

Yet another object of the disclosure is to provide an interactive illustration system, interactive animation system, and method of use that provides stress relief for adults.

Another object of the disclosure is to provide an interactive illustration system, interactive animation system, and method of use that provides anxiety relief for adults.

Yet another object of the disclosure is to provide an interactive illustration system, interactive animation system, and method of use that provides for color layering during a coloring sequence.

Another object of the disclosure is to provide an interactive illustration system, interactive animation system, and method of use that provides animated playback.

Yet another object of the disclosure is to provide an interactive illustration system, interactive animation system, and method of use that provides instant gratification for a user.

Another object of the disclosure is to provide an interactive illustration system, interactive animation system, and method of use that provides for animation creation.

Yet another object of the disclosure is to provide an interactive illustration system, interactive animation system, and method of use that provides for music and sound effects.

Another object of the disclosure is to provide an interactive illustration system, interactive animation system, and method of use that provides calming through soundscapes.

Yet another object of the disclosure is to provide an interactive illustration system, interactive animation system, and method of use that is shareable amongst users through various forms of connectivity, including internet, cellular connection, bluetooth, and the like.

Another object of the disclosure is to provide an interactive illustration system, interactive animation system, and method of use that provides prompts for a user.

Yet another object of the disclosure is to provide an interactive illustration system, interactive animation system, and method of use that provides acceleration in brain development.

Another object of the disclosure is to provide an interactive illustration system, interactive animation system, and method of use that provides maintenance for brain functionality.

Yet another object of the disclosure is to provide an interactive illustration system, interactive animation system, and method of use that provide calming influence.

Another object of the disclosure is to provide an interactive illustration system, interactive animation system, and method of use that provides for layering, revealing, and animation, along with animation playback at any level of the layering and coloring sequences.

Yet another object of the disclosure is to provide an interactive illustration system, interactive animation system, and method of use that provides image layering.

Another object of the disclosure is to provide an interactive illustration system, interactive animation system, and method of use that provides animated sequence playback.

Yet another object of the disclosure is to provide an interactive illustration system, interactive animation system, and method of use that provides subsequent layer revealing as layers are completed.

Another object of the disclosure is to provide an interactive illustration system, interactive animation system, and method of use that provides for three-dimensional shaping.

Yet another object of the disclosure is to provide an interactive illustration system, interactive animation system, and method of use that provides shading.

Another object of the disclosure is to provide an interactive illustration system, interactive animation system, and method of use that provides layering.

Yet another object of the disclosure is to provide an interactive illustration system, interactive animation system, and method of use that provides three-dimensional geometrics.

Another object of the disclosure is to provide an interactive illustration system, interactive animation system, and method of use that provides duplication.

Yet another object of the disclosure is to provide an interactive illustration system, interactive animation system, and method of use that provides surprises with subsequent reveals.

Another object of the disclosure is to provide an interactive illustration system, interactive animation system, and method of use that provides storytelling.

Yet another object of the disclosure is to provide an interactive illustration system, interactive animation system, and method of use that provides for erasing.

Another object of the disclosure is to provide an interactive illustration system, interactive animation system, and method of use that provides for cartoon creation.

Yet another object of the disclosure is to provide an interactive illustration system, interactive animation system, and method of use that provides for comic creation.

Another object of the disclosure is to provide an interactive illustration system, interactive animation system, and method of use that provides for comedy creation.

Yet another object of the disclosure is to provide an interactive illustration system, interactive animation system, and method of use that teaches a user how to create animations.

Another object of the disclosure is to provide an interactive illustration system, interactive animation system, and method of use that provides for character creation and storyline development.

Yet another object of the disclosure is to provide an interactive illustration system, interactive animation system, and method of use that provides for image layering and caption creation.

Another object of the disclosure is to provide an interactive illustration system, interactive animation system, and method of use that provides text message sharing of a creation.

Yet another object of the disclosure is to provide an interactive illustration system, interactive animation system, and method of use that provides email message sharing of a creation.

Another object of the disclosure is to provide an interactive illustration system, interactive animation system, and method of use that provides social media sharing of a creation.

Yet another object of the disclosure is to provide an interactive illustration system, interactive animation system, and method of use that provides for multi-player creation play.

Another object of the disclosure is to provide an interactive illustration system, interactive animation system, and method of use that provides layering and peer to peer play.

Yet another object of the disclosure is to provide an interactive illustration system, interactive animation system, and method of use that provides score tracking.

Another object of the disclosure is to provide an interactive illustration system, interactive animation system, and method of use that provides gamification engagement.

Yet another object of the disclosure is to provide an interactive illustration system, interactive animation system, and method of use that provides for true photo manipulation, in which the system transforms a real photo into a colorable plurality of layers.

Another object of the disclosure is to provide an interactive illustration system, interactive animation system, and method of use that provides for true image manipulation, in which the system transforms a real photo into a colorable plurality of layers.

Yet another object of the disclosure is to provide an interactive illustration system, interactive animation system, and method of use that provides for artwork uploading.

Another object of the disclosure is to provide an interactive illustration system, interactive animation system, and method of use that provides photo uploading.

Yet another object of the disclosure is to provide an interactive illustration system, interactive animation system, and method of use that provides photo uploading from social media and other platforms.

Another object of the disclosure is to provide an interactive illustration system, interactive animation system, and method of use that digitizes real world works and layers into lines and separations of layers for coloring.

Yet another object of the disclosure is to provide an interactive illustration system, interactive animation system, and method of use that provides for the creation of personalized eCards for birthdays, holidays, and other special occasions.

Yet another object of the disclosure is to provide an interactive illustration system, interactive animation system, and method of use that provides for event creation and invites.

Another object of the disclosure is to provide an interactive illustration system, interactive animation system, and method of use that provides custom announcements.

Yet another object of the disclosure is to provide an interactive illustration system, interactive animation system, and method of use that provides for responses to event creation and/or invites.

Another object of the disclosure is to provide an interactive illustration system, interactive animation system, and method of use that can layer real images in with coloring layers.

Yet another object of the disclosure is to provide an interactive illustration system, interactive animation system, and method of use that provides superimposing.

Another object of the disclosure is to provide an interactive illustration system, interactive animation system, and method of use that provides ambient noise.

Yet another object of the disclosure is to provide an interactive illustration system, interactive animation system, and method of use that provides dialogue recording and playback.

Another object of the disclosure is to provide an interactive illustration system, interactive animation system, and method of use that provides optical illusions.

Yet another object of the disclosure is to provide an interactive illustration system, interactive animation system, and method of use that provides for sticker design and creation.

Another object of the disclosure is to provide an interactive illustration system, interactive animation system, and method of use that provides the ability to turn colors on and off.

Another object of the disclosure is to provide an interactive illustration system, interactive animation system, and method of use that provides the ability to dim and brighten colors, or turn them off altogether.

Yet another object of the disclosure is to provide an interactive illustration system, interactive animation system, and method of use that provides virtual reality.

Another object of the disclosure is to provide an interactive illustration system, interactive animation system, and method of use that provides virtual reality interactions with sequence.

Yet another object of the disclosure is to provide an interactive illustration system, interactive animation system, and method of use that provides augmented reality.

Another object of the disclosure is to provide an interactive illustration system, interactive animation system, and method of use that provides layering of coloring over and/or under real world environments.

Systems that embody the disclosure, in accordance with the aspects thereof, are typically designed by describing their functions in hardware description languages. Therefore, the present disclosure is also embodied in such hardware descriptions, and methods of describing systems as such hardware descriptions, but the scope of the present disclosure is not limited thereby. Therefore, these and other objects of the disclosure are hereby considered, not only those limited to those found in this summary of disclosure section, but as can be found throughout the scope of this specification and accompanying documents.

DETAILED DESCRIPTION OF THE DISCLOSURE

Figure 1:
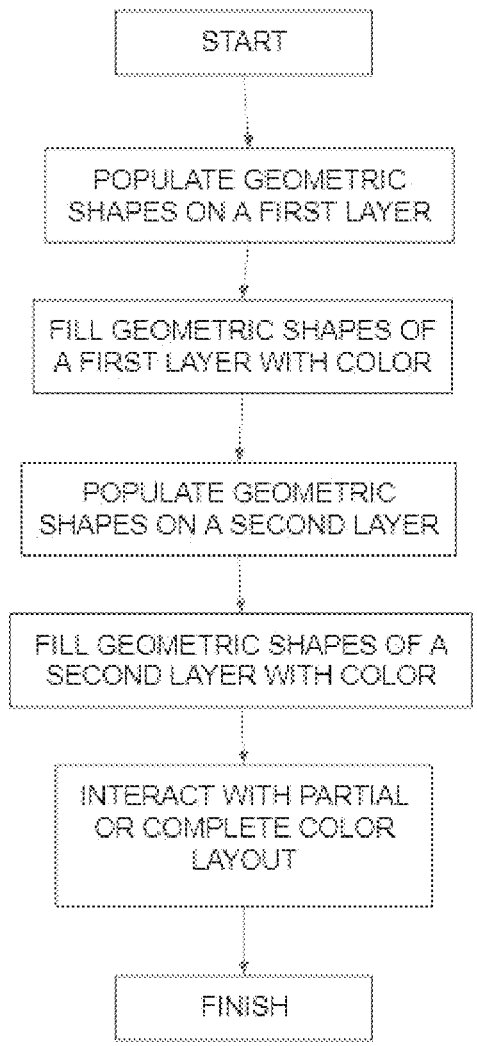
FIG. 1 illustrates an embodiment of a system in accordance with the present disclosure.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

All illustrations of the drawings are for the purpose of describing selected versions of the present disclosure and are not intended to limit the scope of the present disclosure.

Figure 2:
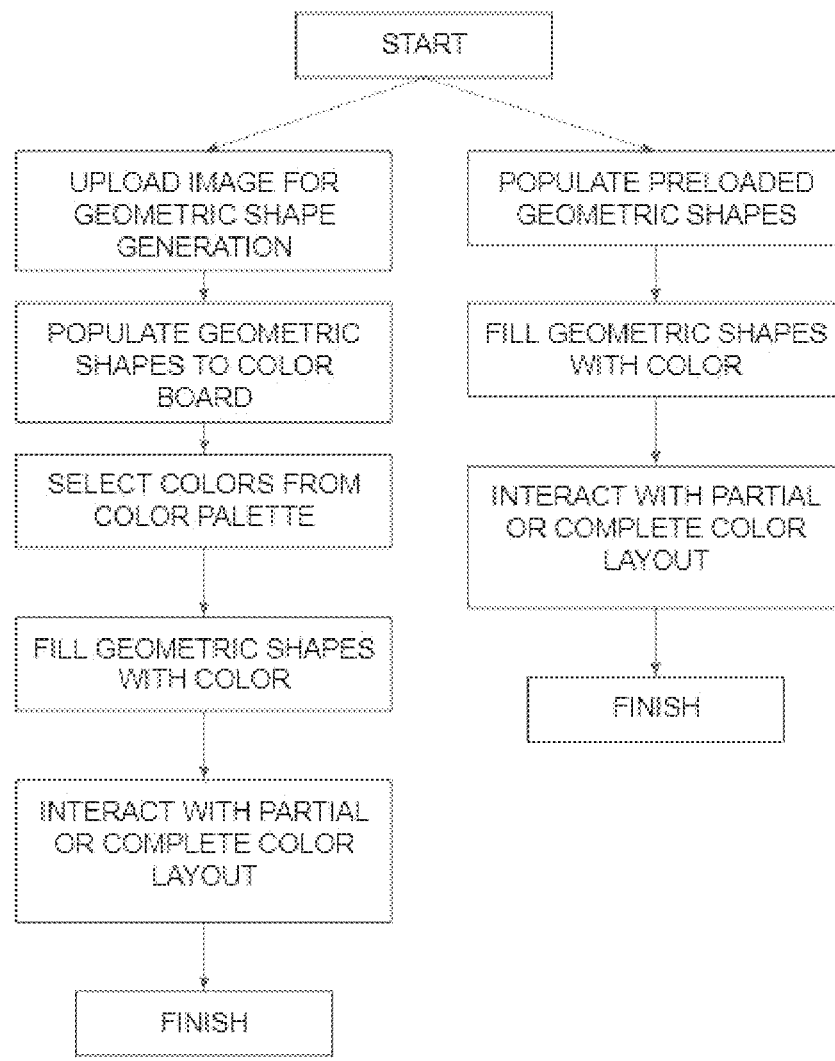
FIG. 2 illustrates an embodiment of a system in accordance with the present disclosure.
Figure 3:
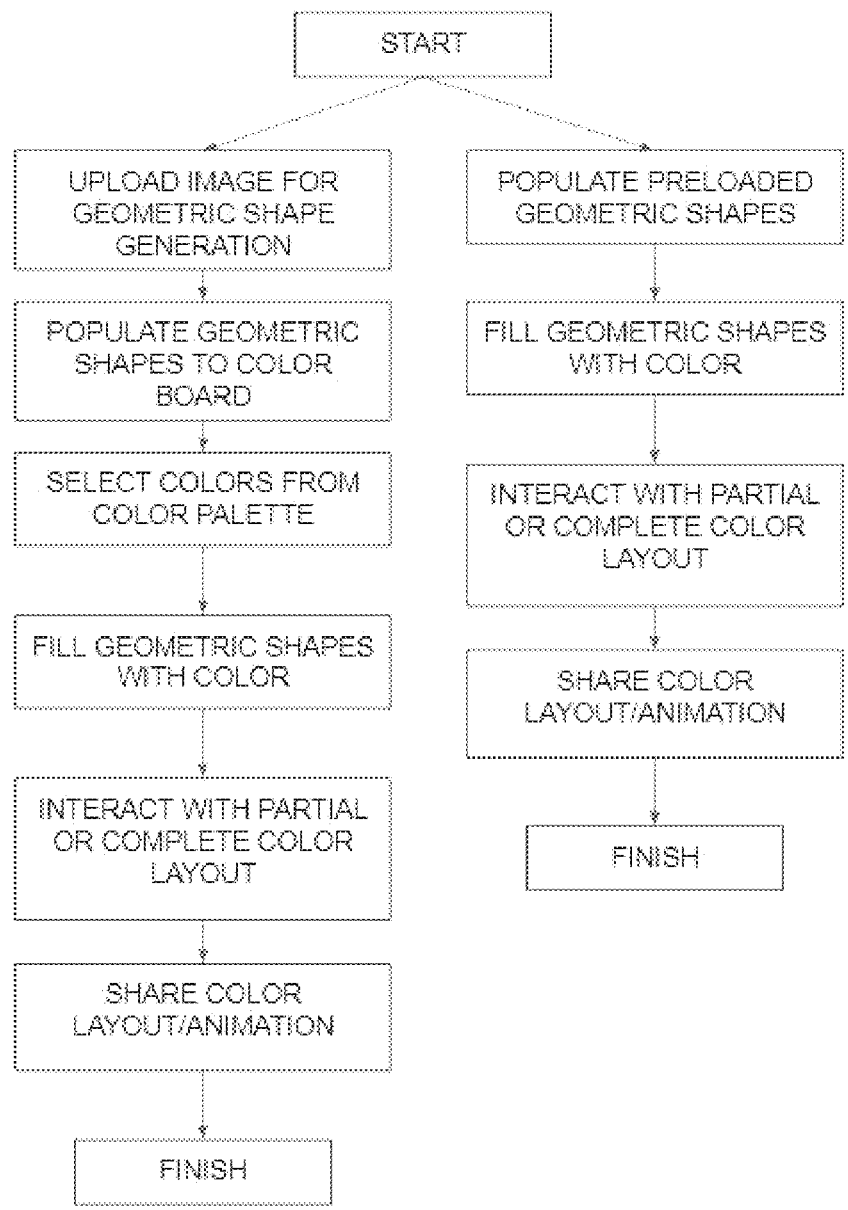
FIG. 3 illustrates an embodiment of a system in accordance with the present disclosure.
Figure 4:
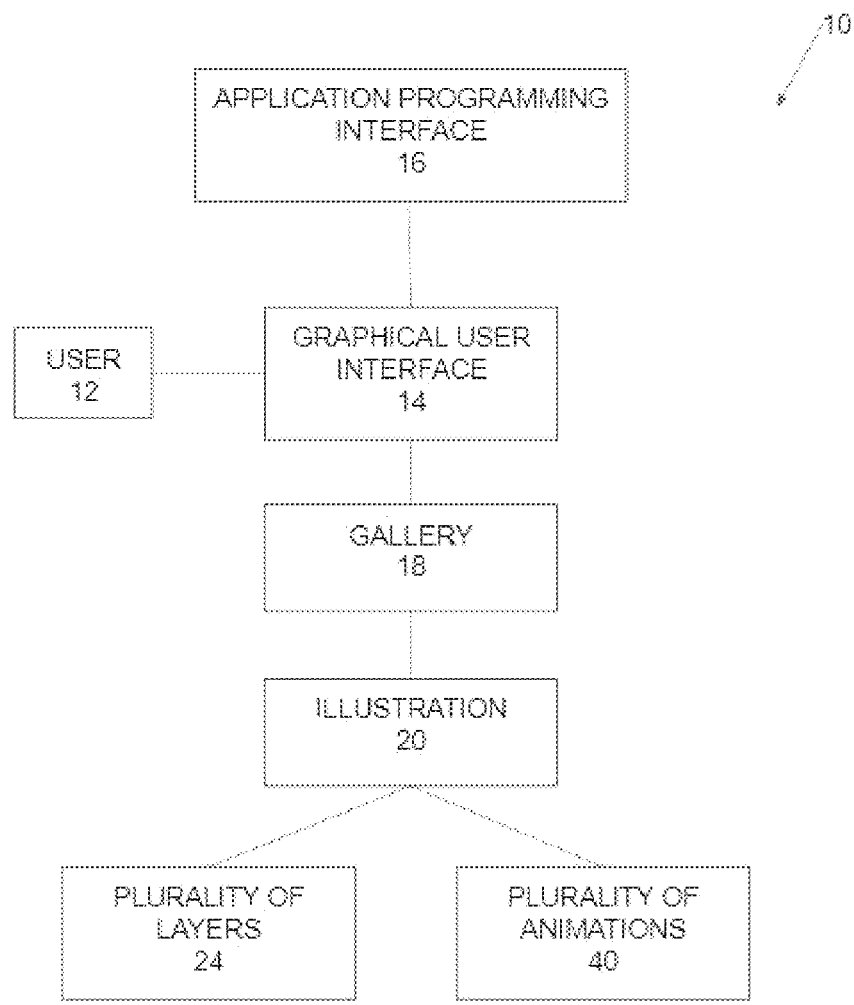
FIG. 4 illustrates an embodiment of a system in accordance with the present disclosure; the view showing a user accessing a graphical user interface and selecting an illustration having a plurality of layers and a plurality of animations, via a gallery.
Figure 5:
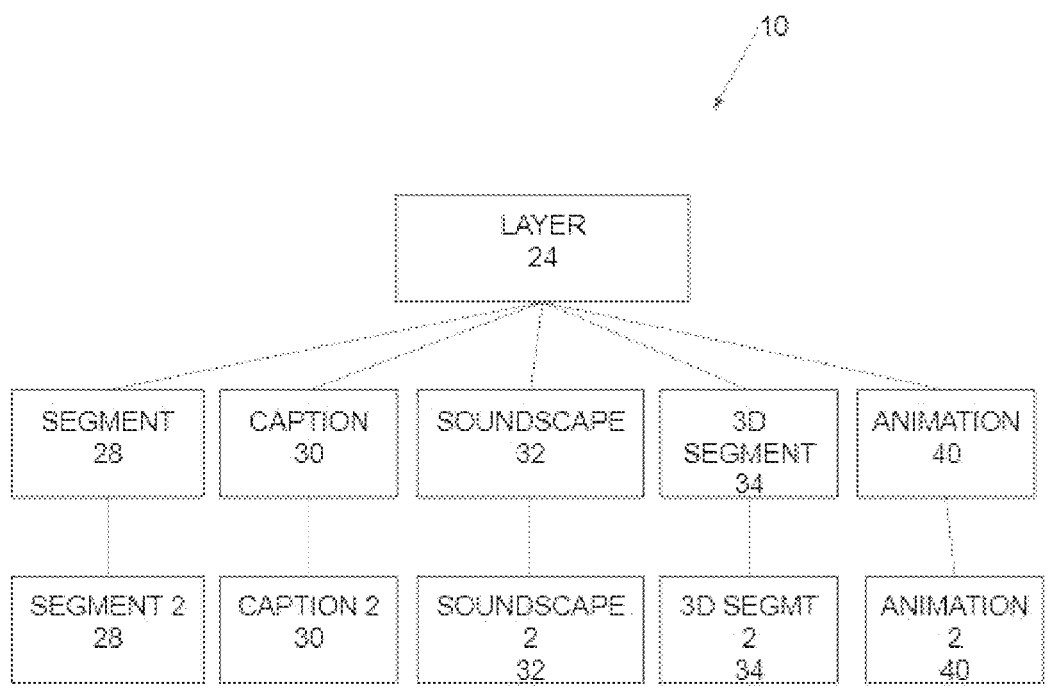
FIG. 5 illustrates an embodiment of a system in accordance with the present disclosure; the view showing a layer having a plurality of segments, a plurality of captions, a plurality of associated soundscapes, a plurality of three-dimensional segments, and a plurality of animations.
Figure 6:
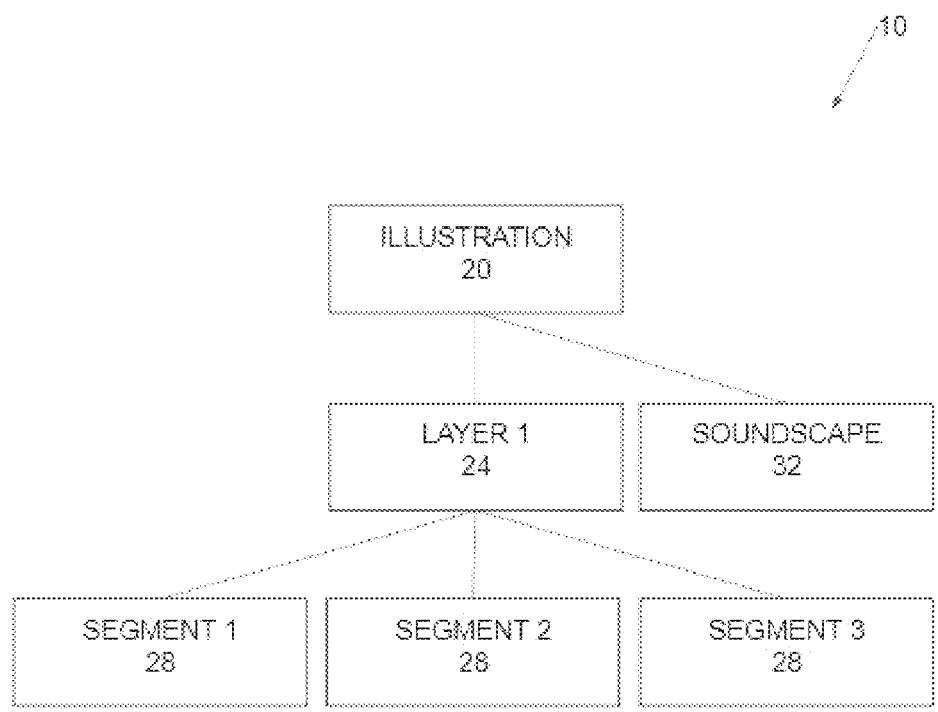
FIG. 6 illustrates an embodiment of a system in accordance with the present disclosure; the view showing an illustration having at least one layer and a soundscape, wherein the soundscape is associated with the illustration.
Figure 7:
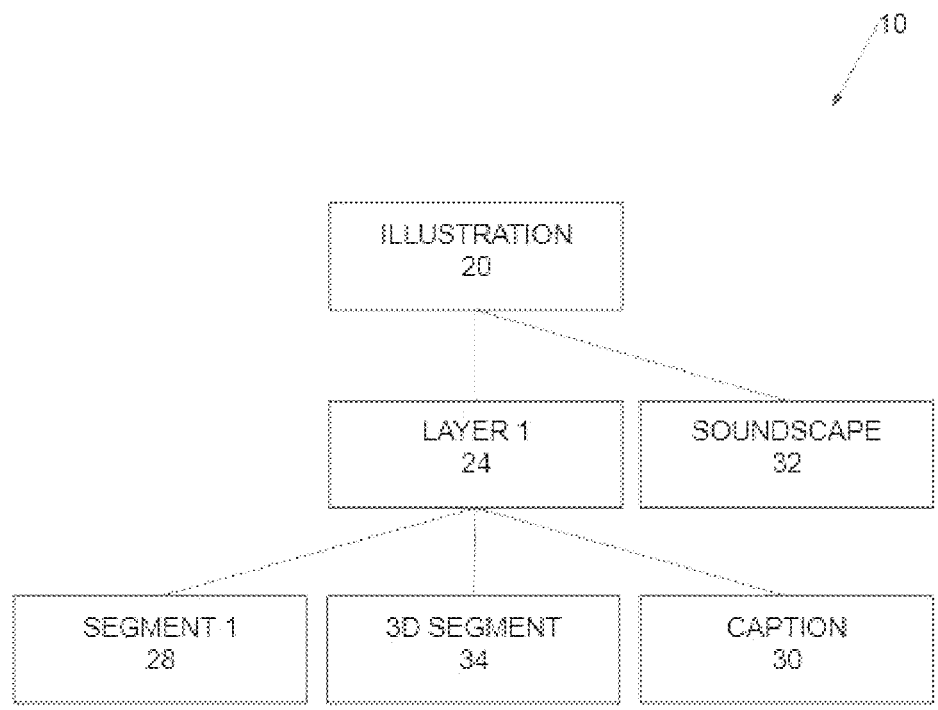
FIG. 7 illustrates an embodiment of a system in accordance with the present disclosure; the view showing an illustration having at least one layer and a soundscape, wherein the soundscape is associated with the illustration.
Figure 8:
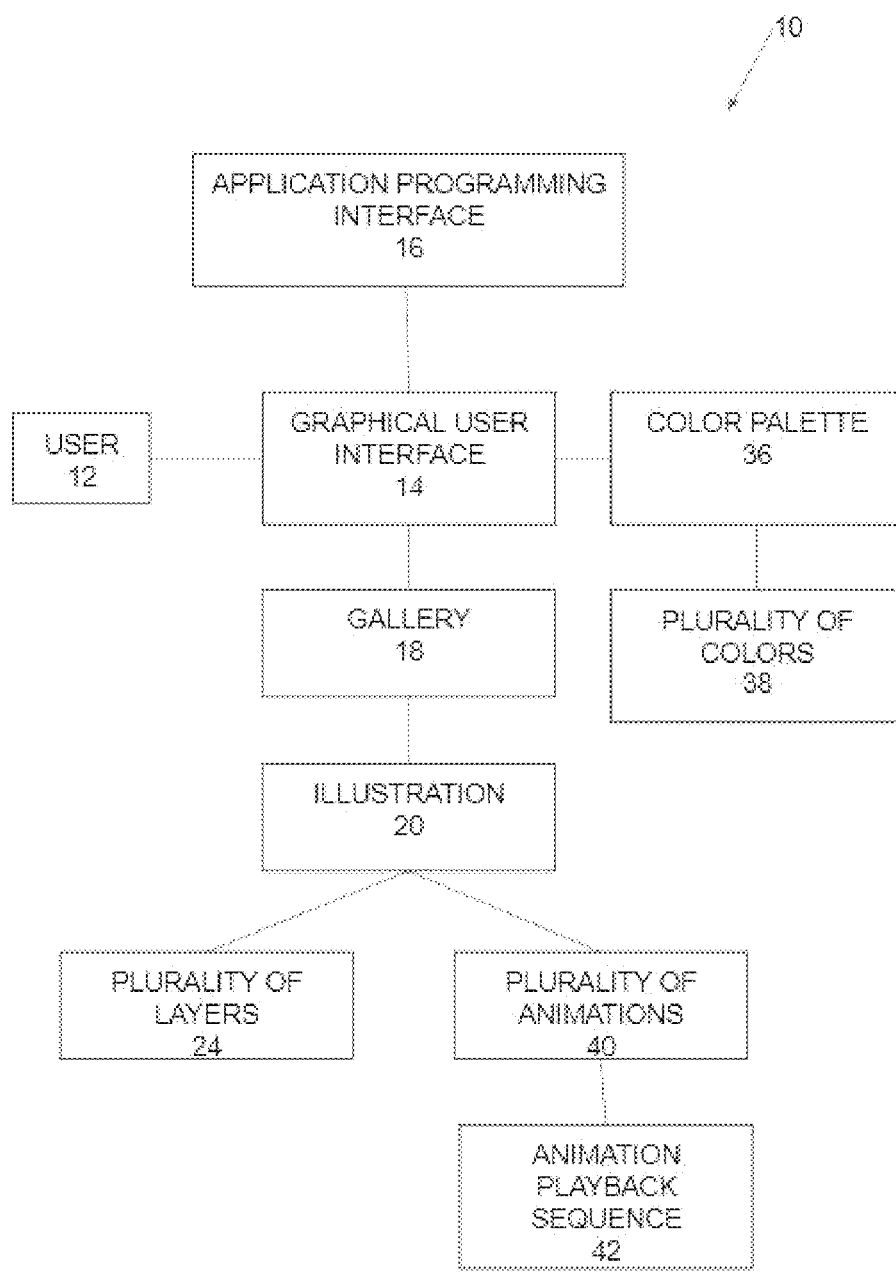
FIG. 8 illustrates an embodiment of a system in accordance with the present disclosure; the view showing a user accessing a graphical user interface and selecting an illustration having a plurality of layers and a plurality of animations, via a gallery.
Figure 9:
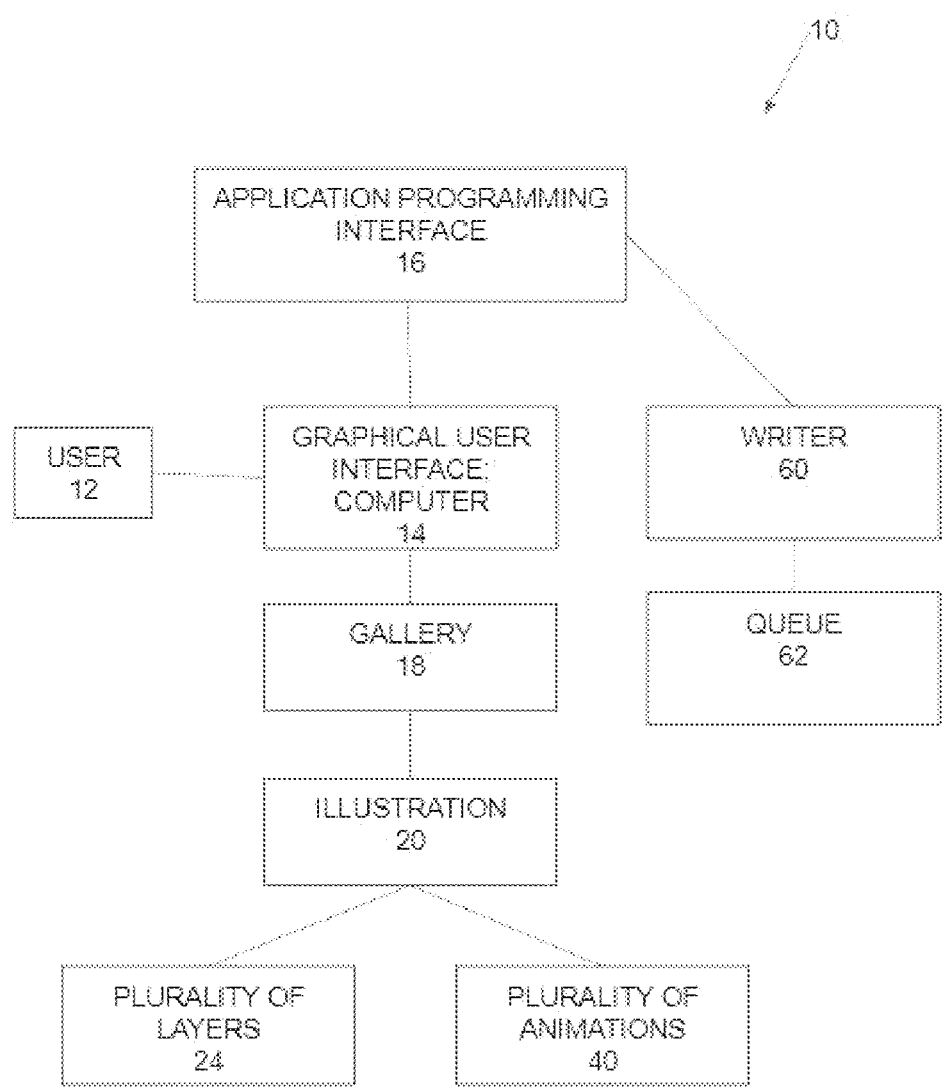
FIG. 9 illustrates an embodiment of a system in accordance with the present disclosure; the view showing a user accessing a graphical user interface and selecting an illustration having a plurality of layers and a plurality of animations, via a gallery; the view showing one association of a writer having a queue.
Figure 10:
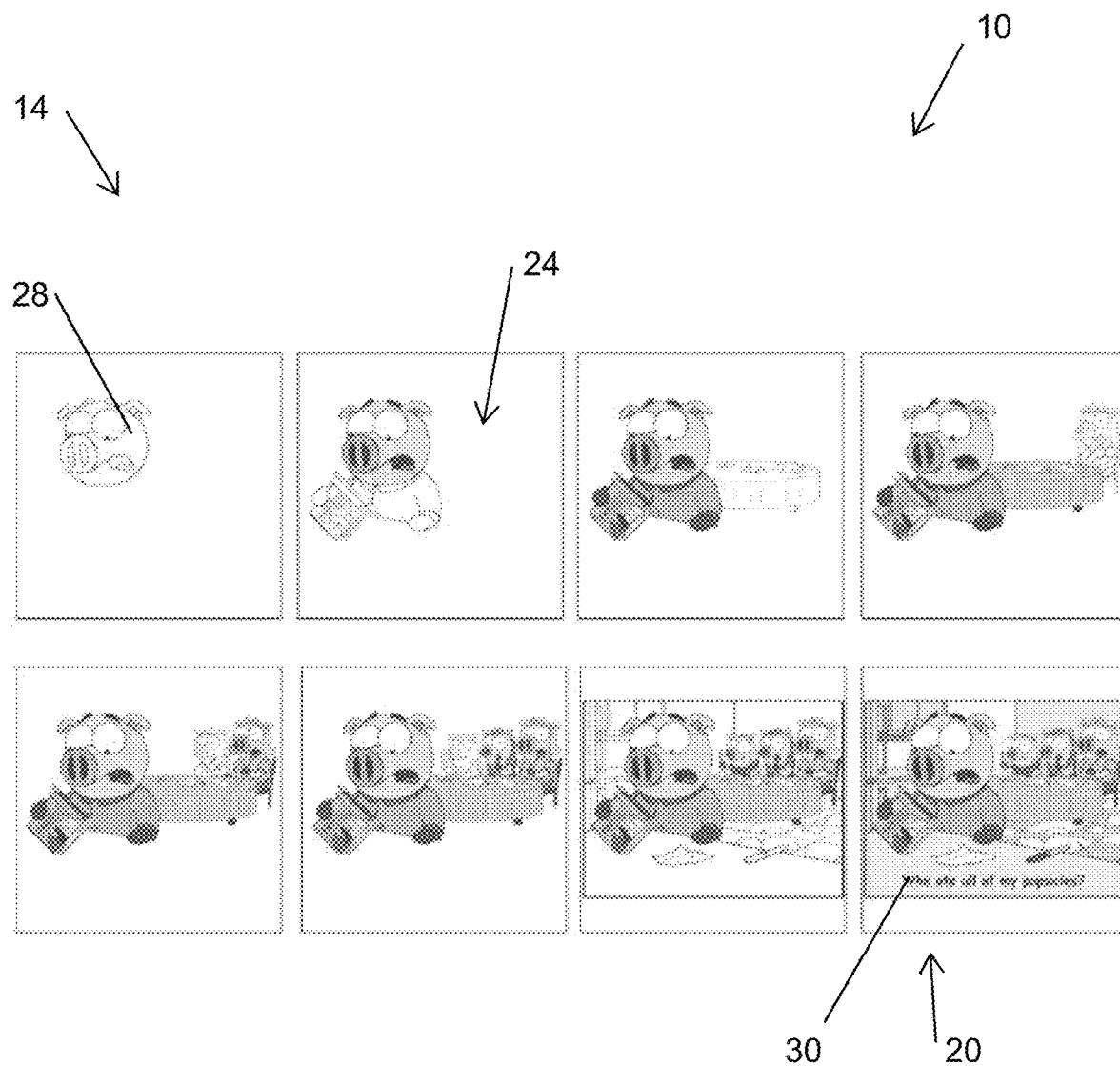
FIG. 10 illustrates an example of the interactive illustration system; the view showing layers populating subsequently as segments are filled with color; the view showing a method of creating a narrative.
Figure 11:
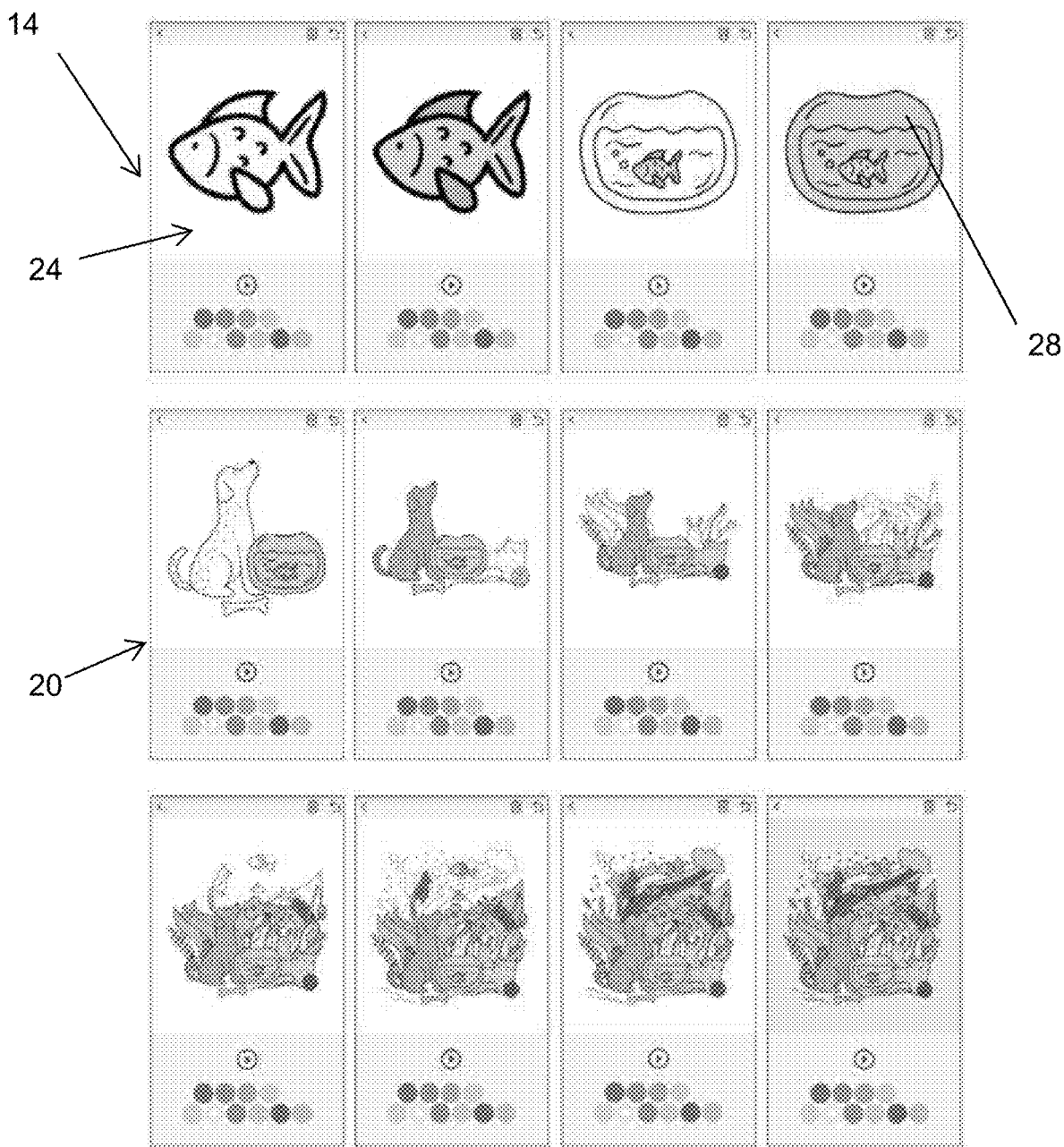
FIG. 11 illustrates an example of the interactive illustration system; the view showing layers populating subsequently as segments are filled with color; the view showing a method of creating a narrative.
Figure 12:
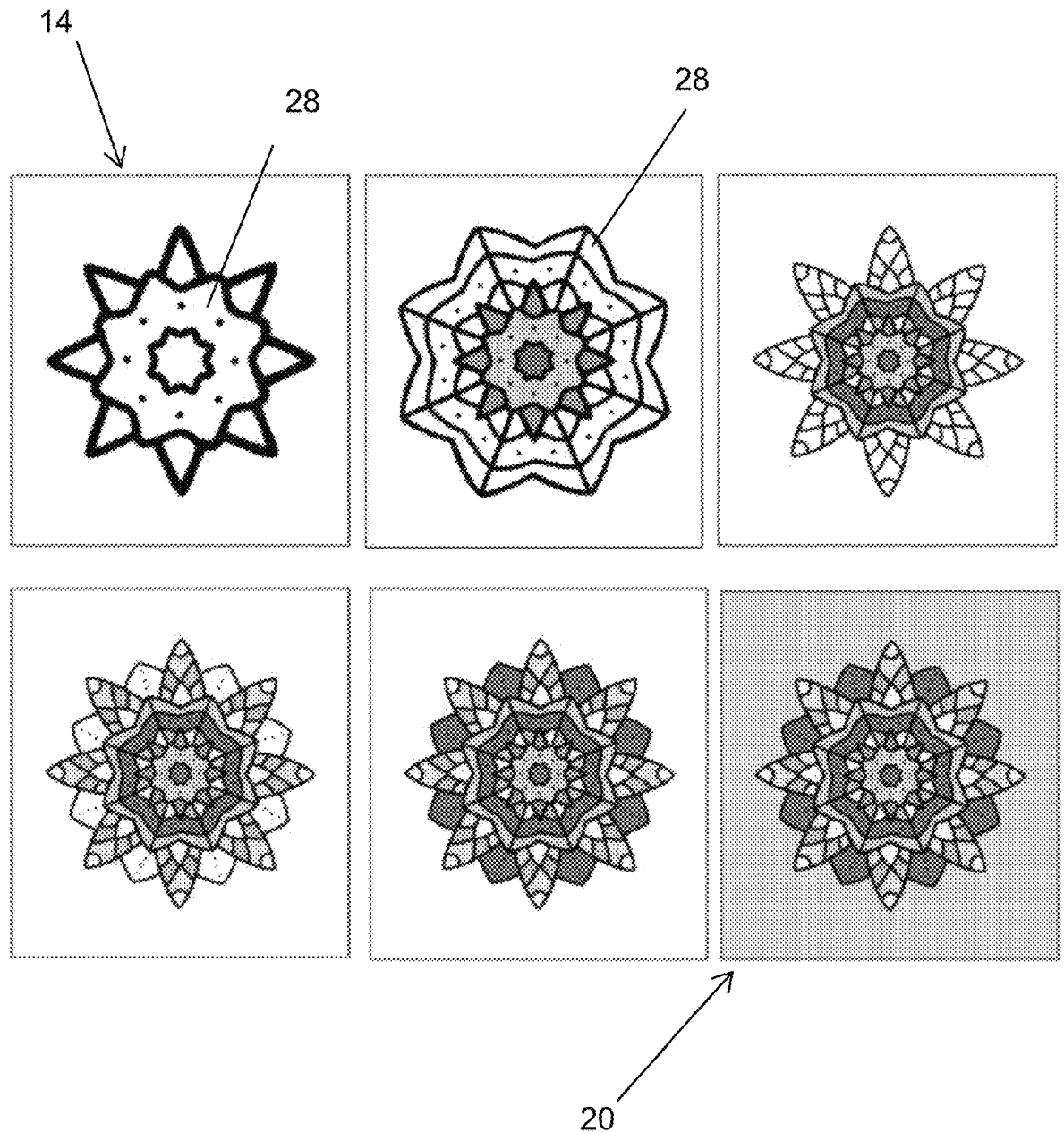
FIG. 12 illustrates an example of the interactive illustration system; the view showing layers populating subsequently as segments are filled with color; the view showing a method of creating an illustration.

The following descriptions are in reference to FIG. 1 through FIG. 12. The present disclosure relates to an interactive illustration system, interactive animation system, and methods of use. The present disclosure provides a novel entertainment system, and strengthening of mental acuity. In this way, the present disclosure offers developmental skill strengthening. Furthermore, the present disclosure provides in maintaining skills.

The present disclosure provides a novel, interactive system and methods of use which include gamification elements. Thus, the present disclosure provides the state of the art with modern, more enjoyable, systems designed to engage users for entertainment, mental development, motor skill and functional development, therapeutic purposes, relaxation assistance, rehabilitation functionality, and hand-eye coordination maintenance and practice skills for injured, trauma, and/or aging users, and the like.

Although the disclosure may be explained in relation to examples of embodiments, it is to be understood that many other possible modifications and variations can be made without departing from the spirit and scope of the invention.

System

With reference to the figures, an interactive illustration system, interactive animation system, and methods of use 10 are presented (hereafter also known as "interactive illustration system", "interaction system", "illustration system", or simply "system"). Interactive illustration system 10 is formed of any suitable size, shape and design. In the arrangement shown, as one example, system 10, may comprise remote servers, databases, application servers, application databases, application programming interfaces, user databases, event databases, transmission rule databases, rules databases, data transmission components and/or features, mobile applications, and/or computers, and the like, that fulfill the functions disclosed herein.

Furthermore, system 10 may also include a user(s) 12, a graphical user interface 14, a database 15, an application programming interface 16, a gallery 18, an animation 40, and a writer 60, among other features, components, and functionality.

User:

In the arrangement shown, as one example, system 10 may include a user 12 and/or a plurality of users 12. In the arrangement shown, a user may be an individual person, a group of people, and/or an entity such as a business, an organization or the like. In this way, and as one example, a user 12 and/or users 12 may be a child or children. In this way, a child can engage with system 10 by coloring in the system, benefiting from various activities and interactions with the system 10 which accelerate the creativity and fine motor skills development of the child or children.

Furthermore, and as another example, a user 12 may be an adolescent and/or an adult and/or a plurality of adolescents and/or plurality of adults and/or a combination thereof. In this way, the users 12 can engage with system 10 by coloring in the system, sharing, interacting with the system 10 (in interactions to be further discussed herein); benefiting from various activities and interactions with the system 10 which cause creative activity, hand-eye coordination development and/or stress reduction and/or anxiety reduction.

Furthermore, and as another example, a user 12 may be an elderly person or elderly people. In this way, an elderly person and/or elderly people can engage with system 10 by coloring in the system, and the like, benefiting from various activities and interactions with the system 10 which keep minds sharp and maintain various skills from fine motor skills to mental stimulation and mental retention and stimulation.

Graphical User Interface:

In the arrangement shown, as one example, system 10 includes a graphical user interface 14. Graphical user interface 14 is formed of any suitable size, shape, and design and is configured to present the user with an easy to use display system and easy to use system for creating illustrations, selecting illustrations from a gallery, sharing illustrations, and the like.

Additionally, graphical user interface 14 is configured to work over networks to share and enhance data, generate reports related to an event and/or illustration data which provide results and/or suggestions for the performance of a plurality of users and the like. Said another way, graphical user interface 14 is configured to allow users to set up online scenarios of real world illustrations, preselected illustrations, and the like and engage with the illustrations simultaneously or in turn. In this way, the graphical user interface 14 is the primary interaction which allows the user to engage with system 10. Additionally, graphical user interface 14 is configured to provide a plurality of users with access to these services in an easy to use way such that a user need not be a highly qualified, and/or expert animators so as to perform the functions and creation available within system 10, or any other steps of the process (as disclosed further herein).

Furthermore, graphical user interface 14 provides an easy way for a user, experienced or inexperienced, to upload information to a database, enter information into a database, storing that information, sharing that information, interpolating this information, and using that information to provide resolutions and/or measurable standardized easy to interpret reports, among other services, as well as mitigation options. Graphical user interface 14 is an exemplary method by which systems of the present disclosure may represent, provide, connect, book, retrieve, and organize, and report, and more.

Application Programming Interface:

In the arrangement shown, as one example, system 10 may also include one or more application programming interfaces ("API").

Illustration:

In the arrangement shown, as one example, system 10 includes an illustration 20 (also known as "drawing", "fillable image", "creation", "interactive creation", "interactive illustration", or "animation" in some cases). Illustration 20 is formed of any suitable size, shape, and design and references the drawing and/or creation that a user fills in. In other words, illustration 20 refers to the shapes that a user fills with color. Additionally, and in the arrangement shown, as one example, the illustration 20 may also include layer(s) 26 (to be further discussed herein), segments 28 (to be further discussed herein), and may also include captions 30 (to be further discussed herein), and may also include sound and/or soundscape 32 (to be further discussed herein), among other features, components, and functionality.

Said another way, the illustration 20 is the primary interaction overview of what a user will experience, what a user may share, and what a user may interact with, as well as what a user may watch. In one way, an illustration can be thought of as a drawing. In this way, a user will take a line drawing, for example, and fill in the spaces between the lines (segments 28) with a color of the user's choosing. Furthermore, a user can progress through an illustration 20 in a series of layers 24.

Layer(s): In the arrangement shown, as one example, an illustration 20 includes a plurality of layers 24. The plurality of layers 24 are formed of any suitable size, shape, and design and are configured to provide a sequence of images and potentially an element of surprise to a user. In the arrangement shown, as one example, as a user fills in the geometric shapes and/or images and/or segments 28 with color and progresses through the filling process, more geometric shapes and/or images will appear. Each addition of geometric shapes and/or images, which a user can fill in and/or that may be pre-filled is considered a unique layer 26. In this way, the system 10 can provide a series of layer reveals that may surprise a user and/or add interest and engagement for a user. Furthermore, this element of progression is utilized as a gamification feature in the arrangement shown. The more layers 24 a user fills in, the more the user can progress through the illustration 20.

Strictly for the purpose of explanation, but not limited to, as one example, and in the arrangement shown, an illustration 20 is presented which includes a plurality of layers 24. The plurality of layers 24 in this illustration 20 are formed of varying shapes that provide a sequence of images and an element of surprise.

As a more specific example, but without limitation, a user may choose an illustration 20 (from the gallery), the illustration 20 being an illustration 20 depicting a barnyard. The complete barnyard illustration 20 contains a plurality of images, these images including a cow, chickens, ducks, horses, sheep, barn, and tractor, among other common objects found and/or depicted with the barnyard setting. These varying images and/or objects are separated into layers 24 and each layer 24 contains a plurality of segments 28. For instance, a first layer 24 contains a horse with the following segments 28: head, ears, mane, body, legs, hooves, and tail. As a user fills each segment 28 with color, additional images and/or objects appear on the screen. In this way, a user progresses through the sequence and progresses through the filling process; more and more images and/or objects appear, to the delight of the user. Each additional image and/or object which a user can fill in and/or color (that provides a plurality of segments 28) is considered a unique layer 24. In this way, in this example, a user can fill a series of layers 24 and the system can reveal subsequent layers 24 that surprise a user and add interest and engagement for a user. Furthermore, in this example, the progression of layers 24 in this way utilizes gamification features. The more layers 24 a user fills in, the more the user can progress through the illustration 20. In this example, a user fills layers 24 with colors, progresses through the plurality of layers 24 and completes an illustration 20 when all images and/or objects of each layer have been completed.

Additionally, and in the arrangement shown, some illustrations may include prompts. Prompts are formed of any suitable size, shape, and design. A prompt indicates to a user when a segment must be completed and/or if a segment hasn't been completed yet when a new layer is desired. A prompt may be in the form of a pop-up window. A prompt may also be in the form of an arrow and/or shaded area to show the user what segment is incomplete, and the like.

Additionally, layers and or illustrations on the whole may have completion indicators. A completion indicator may be formed of any suitable size, shape, and design and is configured to visually indicate to a user what percentage of the layer and/or illustration has been completed. A completion indicator may be in the form of a numerical percentage. The completion indicator may be in the form of a completion bar, a combination of a completion bar and percentage, and the like.

Additionally, system 10 may have a number of other features available during the illustrative process which include, but are not limited to an undo feature, a draw feature, an erase feature, a trash feature, and more.

Segment(s): In the arrangement shown, as one example, each illustration 20, and more specifically, each layer 24 includes a series of segments 28. Segment 28 is formed of any suitable size, shape, and design and is configured as a blank and/or white space for which a user can add color. In the arrangement shown, segments 28 are formed by lines and/or black lines which create geometric shapes and/or images. Segments 28 may also come pre-filled or may have lines of differing colorings, may have borders of varying types, may have three-dimensional characteristics, may be lifelike, may be satellite imagery, may be real-world backgrounds and/or images, and/or they may be formed by a real image, or by the writer 40 (to be further discussed herein).

Caption: In the arrangement shown, as one example, an illustration 20 may also include a caption 30. Caption 30 is formed of any suitable size, shape, design, font, and is configured to provide a type of expression for an illustration 20. In this way, a caption is a text or literary element that can be added to an illustration 20. Caption 30 may be a typography, meaning the text is a typed out font. Additionally, the caption 30 may be formed of words made from geometric shapes which may also be filled in, and the like.

Sound or Soundscape: In the arrangement shown, as one example, an illustration 20 may also include a sound and/or soundscape 32. Sound 32 (or "soundscape") is generally formed of any audio and/or recorded transmission. In the arrangement shown, as one example, sound may be a melody, song, or other recording. Additionally, sound 32 may be formed of a recorded message, such as a story being read by a human voice, sound may also be mechanical recording, and the like. In this way, a user can overlay songs and/or tell stories alongside the illustration.

Furthermore, soundscapes 32 can be layered aurally just as images are layered visually. For example, as a user colors an image in the first visual layer 24, the soundscape 32 can play a single instrument. As the user finishes coloring the first layer 24 and progresses to coloring a second layer 24, the soundscape 32 will add a second instrument sound to the mix, and so on. In this way, soundscape 32 can be created by adding instruments and/or sounds with each layer 24 until the illustration 20 is complete. The finished soundscape 32 will include a plurality of instruments, sound effects, and/or ambient tracks, creating an aural experience.

Three-Dimensional Segments: In the arrangement shown, as one example, an illustration 20 may also include three-dimensional segments 34. Three-dimensional segments 34 are formed of any suitable size, shape, and design and may apply to portions or all of an illustration. Additionally, three-dimensional features may require additional hardware and/or software such as three-dimensional glasses, virtual reality, augmented reality, and the like and these technologies in use with the disclosure, are hereby considered contemplated for use in conjunction with the disclosures made herein.

Gallery: In the arrangement shown, as one example, system 10 may also include a gallery 18. Gallery 18 is formed of any suitable size, shape, and design and is configured as a database and/or collection of illustration selections. In this way, a user may "enter" the gallery and choose a piece of work which a user will engage with. Some works of a gallery 18 and/or some illustrations of a gallery may reveal only portions of the work (work-in-progress), while others may reveal all of a work.

In the arrangement shown, as one example, the gallery 18 includes a plurality of collections of illustrations a user may choose from. These collections include, but are not limited to, animal illustrations, cartoon illustrations, flower illustrations, place illustrations, scenic illustrations, fantasy driven illustrations, mandala illustrations, geometric creation illustrations, optical illustrations, three-dimensional illustrations, and more.

Layer Selections: In another arrangement, system 10 includes layer selections. Layer selections are formed of any suitable size, shape, and design and are configured to provide a sense of choice and freedom to a user. In this way, layer selections allow a user to make selections about which layers will populate into an illustration, subsequently to the current layer. Furthermore, in this way, the layer selection feature provides for infinite possibilities and expansion of creativity, and a dramatic increase in the possibilities of the illustrations which can be created.

In one arrangement, the layer selection is arranged as a plurality of selections arranged horizontally along the bottom of the graphical user interface. In this way, and in one example, a set of five different layer selections to be populated are made available to a user. A user merely needs to click on the layer of choice. The layer selections may also include a preview feature so that a user can preview what that layer selection may look like if selected to be populated.

In this example, five different layer selection options are presented. However, any other number of options may be made available including two options, three options, four options, six options, seven options, eight options, nine options, or more options. Additionally, a scroll or drop down menu may make possible the ease of a great number of subsequent choices.

Additionally, and in this way, some layers selections include animations. In this way, a user may select next steps of animations to add to the illustration. Similarly the animations may include a preview feature so that a user can see what the animation will add to the illustration prior to the selection. This preview feature may exist in a small preview way or may be previewed on the illustration itself.

Close Up Mode & Wide Screen Mode:

In the arrangement shown, the system includes the selection of an illustration. In selecting an illustration, a user may choose not to know what the full illustration will be. Said another way, when viewing the gallery to make a selection on an illustration, it may be that only a small portion of the overall illustration is displayed to a user. A user can make the selection of the illustration based on this small portion. In this way, the user will have layers of the remaining illustration and/or animations revealed to the user during the course of filling the colors of the segments and completing the illustration. This is known as "close up mode", such that a user can not see the entirety of the final illustration.

On the contrary, a user may toggle between close up mode and widescreen mode. In widescreen mode, a user will be able to visually see what the outlines of the final product and/or final illustration will be. In this way, a user can select an illustration and/or imagery as desired. For example, if a user desires to draw a plant in a pot, then a user may employ wide screen mode so that a user can find an illustration of a plant in a pot and then select this illustration. On the contrary, if a user wishes to be surprised by the final illustration and revealing of layers, then a user merely needs to stay in the close up mode.

Color Palette: In the arrangement shown, as one example, system 10 includes a color palette 36. Color palette 36 is formed of any suitable size, shape, and design and may have offerings of color in a finite form or infinitive form. In the arrangement shown, as one example, the color palette is formed of a selection of several colors for purposes of drawing and/or filling in the segments 28. In this way, a user may select a color 38 from the color palette 36 and fill that color in a segment 28. Subsequently, a user may select a different, second color 38 from the color palette 36 and paint a subsequent segment and/or another part of the same segment with the color.

Additionally, and in the arrangement shown, as one example, the color palette 38 may include the ability to blend colors, to select from different shadings, to select from infinite amounts of color combinations, to select from "paint brush" sizes and styles, to erase, and many other features which are customizable to a user and/or goal. Furthermore, and by example, a fill color tool is set as the default. In this way, a user simply needs to click on the segment in order to fully fill that segment with color. However, other means of coloring are hereby contemplated for use which included manual filling, and the like.

Animation:

In the arrangement shown, as one example, system 10 may also include an animation 40. Animation 40 is formed of any suitable size, shape, design, length of time, imagery, sequential playback and the like. In the arrangement shown, as one example, animation 40 is configured to provide both partial and full animated playback of an animation of an existing illustration. Furthermore, animation 40 is configured to provide the ability to a user to create animations using an illustration 20. Furthermore, animation 40 is configured to provide teaching aids to a user for the creation of animated playback sequences. In this way, a user can interact with a play and/or pause button to play animation of the segments 28, layers 24, and/or illustration 20 they have completed or are in the process of completing.

Furthermore, each segment 28 can be colored multiple times with overlapping colors so a user can create an animation 40 that changes colors in any, or all, segments 28 of an image before progressing to the next layer of an illustration 20.

Animated Playback Sequence: In the arrangement shown, as one example, system 10 includes an animation functionality 40. Included in the animation functionality 40 is an animated playback sequence 42. The animated playback sequence 42 may be formed of any sequence and may be partial or full playback of layers or of an illustration 20 depending on the completion percentage of the illustration 20. In this way, a user may complete a segment 28 and then press a playback sequence 42. A partial or full animation may take place. In this way, a user can have more interaction with the illustration 20 that they are creating beyond filling colors. A user, in this way, can create short movie type clips and or full animations based on the illustration they are creating.

Original Works:

In the arrangement shown, as one example, system 10 may include original works. Original works are formed of any suitable size, shape, and design. Original works, in the arrangement shown, are any form of original work which a user uploads to system 10. In this way, and as some examples, an original work may be a picture uploaded to system 10, may be a picture captured on a smart device using system 10, may be a video clip and/or series of images uploaded, and/or may be a video and/or series of images captured utilizing system 10.

As one example, a user may capture an image of their pet dog. A user may either capture this image utilizing the functionality of system 10, or a user may upload a previously captured image. The writer 60 of system 10 will then break the image into layers and break the layers into segments, such that a user can color the segments and create a cartoon or colored image of the image they captured. Similarly, a user may capture a short video of their pet dog running. The writer 60 will then break the video into an animated sequence, layers, and segments, such that a user can color the illustration and play the animated sequence.

Furthermore, in this example, the writer 60 creates a queue 62 of layers. In this way, the system 10 will have a specific order in which layers appear. This queue 62 is designed to have layers appear in an appealing order as opposed to a random order. This will make the illustration more engaging and manageable.

Furthermore, the present disclosure includes a system for automatically separating the illustration into layers 24, segments 28, and animations 40. In this way, the system includes a plurality of algorithms that recognize outlines, varying colors, and the like of an illustration so that the system can quickly (nearly instantaneously), separate layers 24, segments 28 and animations 40 and also divide into revealing portions and create an entire color surprise.

Gift:

In the arrangement shown, as one example, system 10 may include a gift feature. Gift feature is formed of any suitable size, shape, and design and is configured to allow a user to share a creation. This gifting or sharing functionality may be done through email, share through social media, and share through other features such as messaging and the like. In this way, a user can share creations, package illustrations, share illustrations created from family images, share illustrations and sound and animations with friends, and the like.

Invitations:

In the arrangement shown, as one example, system 10 may include an invitations feature. Invitations are formed of any suitable size, shape, and design and are configured to share information with a second person and allow that person to respond utilizing system 10. In this way, a user may create an invitation using a custom illustration and/or photo and a receiver of that invitation can indicate a response, such as an RSVP (répondez s'il voîs plait), a yes/no answer, and other responsive indicators. The sender may also include an additional illustration for the receiver to color using the interactive illustration system and return as the RSVP.

Peer to Peer Linking:

In the arrangement shown, as one example, networking and databases, including cloud and/or information streaming and/or sharing can be utilized such that more than one person can engage with an illustration. In this way, more than one user may engage with an illustration at a single time or in collaborative turns. In this way, a plurality of users in various remote locations can collaborate and engage with an illustration as well as one another. In this way, the user creates a game, a social interaction, and the like.

In the arrangement shown, as one example, multiple users can take part in a competition; alternating coloring layers 24 that form an illustration 20 such as coloring an animal, place, or object. In one example, the first user to guess the final illustration earns points. This competitive style example of system 10 also includes, as one example, an interface for multiple users, in remote locations, to collaborate and engage on the same illustration 20 (or at least on the appearance of the same, real-time illustration as a group of users. Additionally, system 10 also includes a video chat so that each user can see the other, communicate with one another through video, audio, textual means as the users collaborate to complete segments 28, layers 24, illustrations 20 and animations.

Application Server:

In the arrangement shown, as one example, system 10 comprises remote servers, databases, and/or computers that fulfill the functions disclosed and described herein. In the embodiment depicted, system 10 comprises at least one application server. Application server comprises one or more computer systems adapted to transmit and receive data regarding selected datasets related to various users and/or datasets related to multiple users. Application server is adapted to a query database with unique identification codes to retrieve data information and/or parameters related to users, projects, items, textual responses, and more.

Application servers may transmit user data related to layers and rules with respect to a single user and/or multiple users. Application server is also adapted to query a user database. This query includes receiving and sending user identification codes and user data and/or textual responses. Additionally, the application server may communicate with a mobile application, which is adapted to present the user information in a form conducive to being viewed on a mobile device and/or handheld device.

As one of ordinary skill in the art may understand, application server, project database, and other databases mentioned herein may be implemented in one or more servers. Furthermore, each may be on multiple servers to increase system efficiency, especially when handling large data gathering, data organizing, such as handling global positioning of a user, following extended rules for various functionality of system 10 and/or processing, updating user information, including various responses entered.

Additionally, multiple servers may have mirrored data to prevent data loss in case of disk failure and/or to decrease access and response times for database queries. In alternative embodiments, application server, and other database procedures may be carried out on computer-readable instructions and data stored on the customer's mobile computing device.

Additionally, system 10 may include a remote server, a computing system, includes an application programming interface ("API") which includes tools and resources enabling a user to operate the embodiments herein, and a cloud computing system.

Computing System:

In one arrangement, as is shown, smart devices and/or system 10 includes computing systems. Computing system is formed of any suitable size, shape, and design and configured to handle computing operations, as are necessary for the operation of the computing functionality of system 10. Computing system may be connected with an electronic network and/or database and/or server or cloud via communication means and includes a processor, a memory, a microcontroller, a printed circuit board, a microprocessor, a receiver/transceiver, among other components.

Computing devices may be formed of any computing device capable of displaying and manipulating data in the manners described herein. Computing devices may include for example a desktop computer, a laptop computer, a tablet, smart phone, or any other computing device or other interactive device.

Computing devices may be a single consolidated component, or alternatively, computing devices may be formed of a plurality of interconnected components that may be co-located or located at different geographic locations. Computing devices may be cloud based or it may be hardware based, or cloud capable. In addition, the connected components of computing devices, including processor, memory, software and interactive user display, may be co-located with computing devices or located at different geographic locations. That is, computing devices may be made of any form of a device or system that individually or collectively performs the computing operations of system 10.

Printed Circuit Board: In the arrangement shown, as one example, system 10 includes a printed circuit board ("PCB"). PCB is formed of any suitable size, shape and design and is configured to facilitate carrying and/or holding other components and/or parts necessary to carry out various computation and/or related functions of system 10. PCB, as one example, might be a surface mounted PCB or a through-hole PCB. PCB, as one example, is green and facilitates connecting the components and/or parts of system 10 by the use of traces and or vias. Traces are formed of any suitable size, shape and design and are configured as lines electrically connecting the components and/or parts of system 10. Vias are formed of any suitable size, shape and design and are configured as holes that connect layers of traces together. Generally, as in shown, traces and vias are soldered to connect the components and/or parts to the PCB.

Microprocessor: Microprocessor is any computing device that receives and processes information and outputs commands according to instructions stored in memory. Memory is any form of information storage such as flash memory, RAM memory, a hard drive, or any other form of memory. Memory may be included as a part of or operably connected to a microprocessor. A receiver/transceiver is connected to a microprocessor. A receiver is used if one way communication is utilized, whereas a transceiver is used if two-way communication is utilized (hereinafter "transceiver").

Memory: In the arrangement shown, as on example, system 10 includes a memory. Memory may be formed of any suitable size, shape and design and is configured to facilitate selective storage and retrieval of data (including data) in association with computing devices, processor, software and interactive user display. Memory may be a single component, such as a single chip or drive or other memory device, or alternatively memory may be formed of a plurality of memory or storage components that are connected to one another that may be co-located or located at different geographic locations.

Methods of Use:

As one example, an interactive illustration system, interactive animation system, and methods of use are presented in this disclosure for the purpose of disclosing an interactive illustration system. The interactive illustration system and one example of a method of use is the following.

Image Layering:

As one example, a user may log into the system via a graphical user interface. A user will then select a pre-loaded illustration from a gallery of illustrations. Once selected, a portion of the illustration will appear in front of the user. This portion of the illustration is a layer. This layer will have one or more segments that appear. A user will then select a color from the color palette. A default color size will be selected for a user. The user will then fill in the space of the segment. A user may change colors by selecting different colors from the palette. A user will fill in all segments of the layer. A second layer will then populate which adds segments to those already existing, such that a first layer and a second layer are presented to a user and the user can fill all the segments in with colors of the first and second layer. Subsequent layers may be presented depending on the illustration selected. In other words, the layering process continues, revealing and expanding the illustration behind and/or coinciding each layer. Illustrations may be formed of 1 or many layers. In an alternative, a user need not wait for completion of a first layer, and may reveal subsequent layers by clicking on a reveal button.

Animated Sequence Playback:

As another example, system 10 provides for animated sequence playback. In this way, a user can watch an animated sequence. In this way, a user may play an animation of the illustration for which they have colored. Additionally, the illustration need not be completed. In this way, a user can watch an animated sequence playback of partially completed illustrations. After watching the playback, a user can make changes to completed portions and/or finish uncompleted portions. This process can be repeated several times. This process can be repeated until all layers 24 of an illustration 20 have been filled.

In other words, animated sequence playback can be engaged by a user at any completion percentage point during the coloring process.

Image Layering with Animated Sequence Playback:

As another example, system 10 provides for image layering with animated sequence playback. In this way, a user combines both the methods of use for having a plurality of layers and the image layering process as outlined herein, plus the animated sequence playback feature as outlined herein.

In other words, a user may log into the system via a graphical user interface. A user will then select a pre-loaded illustration from a gallery of illustrations. Once selected, a portion of the illustration will appear in front of the user. This portion of the illustration is a layer. This layer will have one or more segments that appear. A user will then select a color from the color palette. A default color size will be selected for a user. The user will then fill in the space of the segment. A user may change colors by selecting different colors from the palette. A user will fill in all segments of the layer. A second layer will then populate which adds segments to those already existing, such that a first layer and a second layer are presented to a user and the user can fill all the segments in with colors of the first and second layer. Subsequent layers may be presented depending on the illustration selected. In other words, the layering process continues, revealing and expanding the illustration behind and/or coinciding each layer. Illustrations may be formed of 1 or many layers. In an alternative, a user need not wait for completion of a first layer, and may reveal subsequent layers by clicking on a reveal button.

Subsequently, a user can engage in animated sequence playback of one or more layers. In this way, a user can watch an animated sequence. In this way, a user may play an animation of the illustration for which they have colored. Additionally, the illustration need not be completed. In this way, a user can watch an animated sequence playback of partially completed illustrations. After watching the playback, a user can make changes to completed portions and/or finish uncompleted portions. This process can be repeated. This process can be repeated until all layers 24 of an illustration 20 have been filled.

Image Layering with Caption Creation:

As another example, a user may log into the system via a graphical user interface. A user will then select a pre-loaded illustration from a gallery of illustrations. Once selected, a portion of the illustration will appear in front of the user. This portion of the illustration is a layer. This layer will have one or more segments that appear. A user will then select a color from the color palette. A default color size will be selected for a user. The user will then fill in the space of the segment. A user may change colors by selecting different colors from the palette. A user will fill in all segments of the layer. A second layer will then populate which adds segments to those already existing, such that a first layer and a second layer are presented to a user and the user can fill all the segments in with colors of the first and second layer. Subsequent layers may be presented depending on the illustration selected. In other words, the layering process continues, revealing and expanding the illustration behind and/or coinciding each layer. Illustrations may be formed of 1 or many layers. In an alternative, a user need not wait for completion of a first layer, and may reveal subsequent layers by clicking on a reveal button.

Subsequently and/or in conjunction with, a user may engage in caption creation. In this way, once a user has finished coloring all of the layers of the illustration, they can add captions and/or language to a creation. In this way, a user may add wording, whether typography or the like, and add humor, a story, a theme, and the like, such as a comic strip would be created.

Image Layering with Multi-User Engagement:

As another example, a user may log into the system via a graphical user interface. A user will then select a pre-loaded illustration from a gallery of illustrations. Once selected, a portion of the illustration will appear in front of the user. This portion of the illustration is a layer. This layer will have one or more segments that appear. A user will then select a color from the color palette. A default color size will be selected for a user. The user will then fill in the space of the segment. A user may change colors by selecting different colors from the palette. A user will fill in all segments of the layer. A second layer will then populate which adds segments to those already existing, such that a first layer and a second layer are presented to a user and the user can fill all the segments in with colors of the first and second layer. Subsequent layers may be presented depending on the illustration selected. In other words, the layering process continues, revealing and expanding the illustration behind and/or coinciding each layer. Illustrations may be formed of 1 or many layers. In an alternative, a user need not wait for completion of a first layer, and may reveal subsequent layers by clicking on a reveal button.

Subsequently and/or in conjunction with, a user may engage in sharing, via a network or sharing through the same graphical user interface, by taking turns in layering, or engaging in some of the predefined rules set up with certain illustrations which may have a numbering system or the like such that a first user is to color a first layer, and a second user is to color a second layer, or perhaps a first user is to color even numbered segments and a second user is to cover odd numbered segments.

Image Layering with Multi-user gamification: Furthermore, a matter of gamification elements may be defined wherein a leaderboard and/or competition exists. This gamification element can cause competition and the like between users by tracking and reporting the number of segments a user has filled, the percentage of an illustration a plurality of users have completed, among other metrics and the like.

Image Layering with Original Artwork: Subsequently and/or in conjunction with, a user may engage in uploading original content. A user can upload an original image and/or video. The writer of system 10 then breaks down the original image into layers and segments for the user and/or users to color in and/or animate. Similarly, a user can upload a video, such that the writer can break the video into animation and layers for coloring and interacting with playback. Additionally, a user may upload a hand drawing which the writer will break down into segments and/or layers to be colored in digitally. In this way, Image Layering with Original Artwork and Animated Sequence Playback can be achieved.

Sharing:

Animated Sequence Playback with Customized Gifts: As another example, and in addition to above, a user may create an animated sequence and/or select a pre-created animated sequence to share as a gift to a second user and/or third party. In this way, a user may create an animated sequence through image layering and/or caption creation, and/or animated sequence creation and subsequently share this creation. This sharing can be complete via a text message, an email message, and/or various social media platforms.

Image Layering with Animated Sequence Playback and Custom eCards:

As another example, and in addition to above, a user may create an animated sequence and/or select a pre-created animated sequence to share as a custom eCard to transmit to a second user and/or third party, and plurality of users and/or plurality of third parties. In this way, eCards can be used for a variety of special occasions, including but not limited to, birthdays, holidays, graduation, sympathy, and anniversaries. In this way, a user may create an animated sequence through image layering and/or caption creation, and/or animated sequence creation and subsequently share this creation. This sharing can be complete via a text message, an email message, and/or various social media platforms.

Image Layering with Animated Sequence Playback with Invitations:

As another example, and in addition to above, a user may create an animated sequence and/or select a pre-created animated sequence to share as an invitation to a second user and/or third party and/or plurality of users and/or plurality of third parties. In this way, a user may create an animated sequence through image layering and/or caption creation, and/or animated sequence creation and subsequently share this invitation. This sharing can be complete via a text message, an email message, and/or various social media platforms.

Subsequently, the system provides a means for a second user and/or third party to respond to the invitation by some indication. As one example, this is a yes or no indication. In another example, this is an RSVP-type selection. In another example, this may be a numerical indication. These and other types of responses, as a user may choose, can be an indicator to an invitation.

Image Layering with Animated Sequence Playback and Custom Announcements:

Similarly, and as another example, and in addition to above, a user may create an animated sequence and/or select a pre-created animated sequence to share as an announcement to a second user and/or third party. In this way, a user may create an animated sequence through image layering and/or caption creation, and/or animated sequence creation and subsequently share this creation. This sharing can be complete via a text message, an email message, and/or various social media platforms.

Image Layering with Animated Sequence Playback and Art Books:

As another example, and another method of use for system 10, image layering and/or animated sequence playback functionalities (as discussed herein) can be utilized to create custom online photo books and/or custom online art books. These books may be random or may be dedicated to a particular event, and the like.

Image Layering with Soundscape Integration and/or Dialogue Integration:

Similarly, and as another example, and in addition to above, a user may create an image layered illustration and/or a pre-created image layering and introduce sounds. These sounds can be incorporated into the animated sequence playback and/or layering in the form of music, dialogue, recorded dialogue, white noise, and/or other sound effects.

Image Layering with Animated Sequence Playback and Dialogue Integration:

Similarly, and as another example, and in addition to above, a user may create an image layered illustration and/or an animated sequence and/or select a pre-created animated sequence and introduce sounds. These sounds can be incorporated into the animated sequence playback and/or layering in the form of music, dialogue, recorded dialogue, white noise, and/or other sound effects.

Image Layering with Animated Sequence Playback and Optical Illusion Integration:

Similarly, and as another example, and in addition to above, a user may create an image layered illustration and/or an animated sequence and/or select a pre-created animated sequence and introduce optical illusions.

Image Layering with Animated Sequence Playback and Sticker Creation:

Other methods of use may include sticker generation. In this way a user would generate stickers from the illustrations the user creates. Other generations might include merchandise creation, such as t-shirts, baseball caps, and the like.

Image Layering with Animated Sequence Playback and Color Controls:

Another method of use includes color controls. Said another way, color controls provide a means for a user to turn layers and/or segments on and/or off such that a color may not appear, even if completed until the final product is ready for viewing and/or the entire illustration has been completed. Color Controls also provides a user the ability to brighten and/or dim colors in a layer 24 or illustration.

Image Layering with Animated Sequence Playback and Virtual Reality Integration:

Yet another method of use includes virtual reality integrations. Said another way, a user may engage with the illustration and/or three-dimensional illustration virtually. In this way, a user can color images in a virtual world with arm movements and the like. Additionally, a user may color three-dimensional images and the like and have virtual reality playback.

Image Layering with Animated Sequence Playback and Augmented Reality Integration:

Similarly, and as another method of use includes augmented reality integrations. Said another way, a user may engage with the illustration and/or three-dimensional illustration both in the real world and virtually. In this way, a user can color images in a virtual world with arm movements and the like. Additionally, a user may color three-dimensional images and the like and have virtual reality playback.

Method of Creating an Illustration:

As another example, a method of creating an illustration is included. Various methods are included for creating the various types of illustrations. For example, an illustration may be created by breaking a work into a plurality of layers. This is completed by tracing the outline of the object desired to be on a layer. Subsequently, the object outlined will be assigned to a layer. In this way, objects can be made to appear in certain orders. The process can be very complex as layers must be populated in a particular narrative which makes sense to a user. Similarly, illustrations can have animations which adds an added layer of complexity.

Method of Creating a Narrative:

As another example of methods of using the system herein. Stories can be generated and told using the layering system. In one example, a comical narrative is created which reveals portions of an illustration at each layer of each sequence. In this way, humor, and other storytelling methods can be enacted through the disclosure herein.

Method of Narrative Playback/Animation Playback/Learning Tool:

As another example of methods of using the system herein. Short clips and/or long clips of narratives can be created and subsequently used as entertainment clips. In this way, a creator can create a short clip using the disclosure herein. The creator can then post this clip for others to view. In this way, a viewer can view the clip which will reveal itself in layers and/or in ways disclosed by the system herein, such as through layered sound and the like. In this way, a user can create a narrative which will play and can be repeatedly played for viewers.

Similarly, this narrative can be a layered animation sequence which can be viewed as an advertisement, as a story, as a comedic sketch, and the like. In this way, a creator can easily create dynamic, animation-like sequences of scenes with little or no experience in animation technology and functionality. This hybrid, dynamic technology for creating a narrative can also serve as a learning tool and/or bridge from taking someone with no experience, and filling a long existing gap in the state of the art, such that an amatuer and/or someone with no experience can create animations and/or narratives. Said another way, this method of use provides a creator the ability to create a narrative without having to have the expertise of a very experienced animator and without having to dedicate large amounts of time into animation creation. Furthermore, this method of use provides a learning experience which can help a creator understand how to create animations, such that a novice creator can gain expertise and experience in moving toward being a master animation artist.

As another example of this method of use, and as just one example, a creator may create a narrative based on several layers in which more and more layers are revealed and perhaps sounds and animations are also revealed. This narrative can be posted and/or sent to others for viewing. One method of providing the ability for others to view the narrative is to post on social media, send through email, send through text messaging, or simply to playback the narrative. These and other means of sharing a narrative are hereby contemplated for use.

As another example of this method of use, and as just one example, an advertiser may wish to create an advertisement and/or humorous narrative. Narratives can be created for advertising animated movies and the like, in this way, far before any animations have actually been completed. Professional animation artists may spend months creating a short movie trailer which is only 10-30 seconds long. In this way, and in this method, movie trailers and the like can be created in a fraction of the time such that advertisements can be put out and/or narratives posted. This method does not only apply to movie trailers, but any narrative which desires to be created, such as a narrative which reveals a product which could be a bike, a kids toy, a food, a restaurant and the like. These advertisements and narratives are also hereby contemplated for use, in addition to entertainment value narratives and the like.

These and other methods of use and processes are hereby contemplated for use.

It will be appreciated by those skilled in the art that other various modifications could be made to the device without parting from the spirit and scope of this disclosure (especially various programmable features). All such modifications and changes fall within the scope of the claims and are intended to be covered thereby.

What is claimed:

1. A system for an interactive illustration creation, the system comprising:
   a plurality of illustrations;
      each of the plurality of illustrations having a plurality of layers;
      each of the plurality of layers having a plurality of segments;
   a color palette;
      the color palette having a plurality of colors;
   a writer;
   wherein the writer sorts each of the plurality of layers;
   a queue;
   wherein the queue presents the plurality of layers in a predetermined order;
   wherein a subsequent layer of the plurality of layers is populated when each of the plurality of segments a current layer of the plurality of layers is filled with a color of the plurality of colors;
   a prompt;
   wherein the prompt notifies a user when at least one segment of the plurality of segments has not been filled in with one of the plurality of colors.

2. The system of claim 1, further comprising:
   a plurality of layer options;
   wherein a user can select the next layer to populate into an illustration from a plurality of layer options.

3. The system of claim 1, further comprising:
   wherein the subsequent layers are not presented until all segments of the plurality of segments of the current layer of the plurality of layers are completed.

4. The system of claim 1, further comprising:
   a preview feature.

5. The system of claim 1, further comprising:
   a plurality of soundscapes;
      each of the plurality of soundscapes having a plurality of aural layers;
   a writer;
      wherein the writer sorts each of the plurality of aural layers.

6. The system of claim 1, further comprising:
   a soundscape;
   the soundscape being a recorded dialogue;
   wherein the soundscape can be imposed upon the illustration.

7. The system of claim 1, further comprising:
   a gift.

8. The system of claim 1, further comprising:
   an invitation.

9. The system of claim 1, further comprising:
   an eCard;
   wherein a user creates the eCard;
      the eCard having a plurality of illustrations.

10. A system for an interactive illustration creation, the system comprising:
    a plurality of illustrations;
       each of the plurality of illustrations having a plurality of layers;
       each of the plurality of layers having a plurality of segments;
    a color palette;
       the color palette having a plurality of colors;
    a writer;
    wherein the writer sorts each of the plurality of layers;
    a queue;
    wherein the queue presents the plurality of layers in a predetermined order;
    wherein a subsequent layer of the plurality of layers is populated when each of the plurality of segments a current layer of the plurality of layers is filled with a color of the plurality of colors;
    wherein the writer sorts the plurality of layers into the queue;
    wherein the queue populates the plurality of layers into the illustration at a set of predetermined completion phases.

11. The system of claim 10, further comprising:
    a plurality of layer options;
    wherein a user can select the next layer to populate into an illustration from a plurality of layer options.

12. The system of claim 10, further comprising:
    an eCard;
    wherein a user creates the eCard;
       the eCard having a plurality of illustrations.

13. The system of claim 10, further comprising:
    a prompt;
    wherein the prompt notifies a user when at least one segment of the plurality of segments has not been filled in with a color;
    wherein the subsequent layers are not presented until all segments of the plurality of segments of the current layer of the plurality of layers are completed.

14. The system of claim 10, further comprising:
    a preview feature.

15. The system of claim 10, further comprising:
    a plurality of soundscapes;
       each of the plurality of soundscapes having a plurality of aural layers;
       wherein the writer sorts each of the plurality of aural layers;
       wherein the plurality of soundscapes are configured from a list including: music, sound effects, and ambient sounds.

16. The system of claim 10, further comprising:
a soundscape;
the soundscape being a recorded dialogue;
wherein the soundscape can be imposed upon the illustration.

17. The system of claim 10, further comprising:
a gift.

18. The system of claim 10, further comprising:
an invitation.

19. A system for an interactive illustration creation, the system comprising:
a plurality of illustrations;
  each of the plurality of illustrations having a plurality of layers;
  each of the plurality of layers having a plurality of segments;
a color palette;
  the color palette having a plurality of colors;
a writer;
wherein the writer sorts each of the plurality of layers;
a queue;
wherein the queue presents the plurality of layers in a predetermined order;
wherein a subsequent layer of the plurality of layers is populated when each of the plurality of segments a current layer of the plurality of layers is filled with a color of the plurality of colors;
wherein the writer sorts the plurality of layers into the queue;
wherein a user can trigger the queue to populate the plurality of layers into the illustration on command.

20. The system of claim 19, further comprising:
a preview feature.

* * * * *